United States Patent [19]

Radlove

[11] 3,920,732
[45] Nov. 18, 1975

[54] PROCESS FOR STABILIZED ETHYLENICALLY UNSATURATED BETA-HYDROXY ESTERS

[75] Inventor: Sol B. Radlove, Chicago, Ill.

[73] Assignee: Continental Can Company, Inc., New York, N.Y.

[22] Filed: May 24, 1974

[21] Appl. No.: 473,036

Related U.S. Application Data

[63] Continuation of Ser. No. 306,106, Nov. 13, 1972, abandoned, which is a continuation-in-part of Ser. No. 242,777, April 10, 1972, abandoned.

[52] U.S. Cl....... 260/486 B; 260/410.6; 260/410.5; 260/488 J; 260/488 CD
[51] Int. Cl.²......................................... C01C 69/54
[58] Field of Search .............................. 260/486 B

[56] References Cited

UNITED STATES PATENTS

| 3,373,075 | 3/1968 | Fekete et al. ................... 260/486 B |
| 3,708,524 | 1/1973 | Murayama ...................... 260/486 B |

*Primary Examiner*—Lorraine A. Weinberger
*Assistant Examiner*—Paul J. Killos
*Attorney, Agent, or Firm*—Paul Shapiro; Joseph E. Kerwin; William A. Dittmann

[57] ABSTRACT

An ethylenically unsaturated beta-hydroxy ester stabilized to gel formation but which remains susceptible to polymerization by ionizing radiation is obtained by reacting a polyepoxide with an alpha, beta-ethylenically unsaturated carboxylic acid such as acrylic or methacrylic acid in the presence of a tin halide salt.

7 Claims, No Drawings

PROCESS FOR STABILIZED ETHYLENICALLY UNSATURATED BETA-HYDROXY ESTERS

This application is a continuation of Ser. No. 306,106, filed Nov. 13, 1972, now abandoned, which is a continuation-in-part of application Ser. NO. 242,777, filed Apr. 10, 1972, now abandoned.

BACKGROUND OF THE INVENTION

1. Field of Invention

This invention is related to ethylenically unsaturated beta-hydroxy ester compositions and more particularly, to stabilized beta-hydroxy ester compositions susceptible to polymerization using ionizing radiation.

2. The Prior Act

Printing or decorating metal substrates is conventionally accomplished using inks composed predominately of a drying oil vehicle pigmented to the desired color which is dried by baking in air. Conventional printing inks prepared with drying oil vehicles contain a substantial amount of a volatile organic solvent which must be removed as the ink dries. The evaporation of the solvent creates an air pollution problem which many present day communities will not tolerate.

One method of avoiding the use of solvents in preparing printing ink vehicles which has been attempted by the art is to prepare the vehicle from an unsaturated polyester composition of suitable viscosity which can be polymerized and dried by exposure to ionizing radiation as for example, U.S. Pat. Nos. 3,326,710, 3,511,687, 3,551,235, 3,551,246, 3,551,311, and 3,558,387.

One class of unsaturated compositions which is particularly suitable as radiation curable ink vehicle components is the ethylenically unsaturated beta-hydroxy esters. Ethylenically unsaturated beta-hydroxy esters are known to the art and are prepared by reacting a polyepoxide having at least two reactive epoxide groups with an alpha, beta-ethylenically unsaturated carboxylic acid.

Heretofore, ethylenically unsaturated beta-hydroxy esters have been prepared through the use of tertiary amines as a catalyst e.g., U.S. Pat. No. 2,824,851 with the inclusion of a vinyl polymerization inhibitor such as hydroquinone. The storage life of such ester products has been limited as the esters are very reactive monomeric materials and form useless gels when stored for short periods, i.e., within 1 month's time. The presence of vinyl polymerization inhibitors in the ester product interferes with the sensitivity of the ester toward polymerization with ionizing radiation and the removal of the inhibitor from the ester reaction product is a difficult and costly procedure.

Although the art has proposed the addition of stabilizing agents to the ethylenically unsaturated beta-hydroxy ester compositions to stabilize the compositions to premature gelation, e.g., U.S. Pat. No. 3,408,422, in many cases the addition of such agents further diminishes the sensitivity of the ester toward ionizing radiation, thereby reducing the utility of the unsaturated esters as radiation curable compositions.

SUMMARY OF THE INVENTION

In accordance with the present invention there is provided a method for preparing an ethylenically unsaturated beta-hydroxy ester composition which is stable to premature gel formation and which is sensitive to rapid polymerization by exposure to a source of ionizing radiation wherein the reaction between the polyepoxide and the alpha, beta-ethylenically unsaturated carboxylic acid to form the beta-hydroxy ester is conducted in the presence of a tin halide salt.

Ethylenically unsaturated beta-hydroxy esters prepared in accordance with the present invention withstand gel formation at ambient temperatures for more than 28 weeks with no appreciable diminution of sensitivity to activation by ionizing radiation. By the process of the present invention the ethylenically unsaturated ester is stabilized against premature gelation by inter-reaction with itself as well as with any other unsaturated monomer with which the ester may be mixed or blended and the need for polymerization inhibitors is thereby greatly diminished.

PREFERRED EMBODIMENTS

Typical tin salts that may be employed in the process of the present invention include the tin halide salts such as $SnCl_2$.

The amount of tin salt incorporated in the reaction mixture may vary over a considerable range. In general, the amount of tin salt will vary from about 0.10% to about 3.0% by weight of the reactants involved in the ester forming reaction and more preferably from about 0.2% to about 0.6% by weight of the reactants.

The reaction to prepare the ethylenically unsaturated beta-hydroxy ester includes alkaline catalysts such as tertiary amines, quarternary ammonium hydroxides, quarternary ammonium halides, benzyl trimethyl ammonium hydroxide, N, N'-dimethylanline, N, N'-benzyl dimethyl amine, potassium hydroxide, or lithium hydroxide to accelerate the rate of reaction.

The amount of catalyst incorporated in the reaction mixture may vary over a considerable range. In general, the amount of the catalyst will vary from about 0.2% to about 2.0% by weight and more preferably from 0.6% to 0.8% by weight of the reactants.

The reaction to prepare the gel stable ethylenically unsaturated beta-hydroxy ester may be conducted in the presence or absence of solvents or diluents. In cases where the reactants are liquid, the reaction may be effected in the absence of solvents. When either or both reactants are solids or viscous liquids, it may be desirable to add solvents to assist in effecting the reaction. Examples of suitable solvents include inert organic liquids such as ketones, such as methyl ethyl ketone, hydrocarbons such as cyclohexane and aromatic solvents such as toluene and xylene.

Temperatures employed in the reaction to form the beta-hydroxy ester will generally vary from about 50° to 150°C and preferably about 90° to 105°C. The reaction is conducted under an inert atmosphere such as nitrogen, and may be conducted at atmospheric or reduced pressure under reflux conditions.

The reaction to form the beta-hydroxy ester requires about a 1 to 10 hour period to be completed or until the alpha, beta-ethylenically unsaturated carboxylic acid is substantially consumed. The course of the reaction may be conveniently followed by a determination of the acidity. The reaction is considered to be substantially complete when the acidity has been reduced to an acid number of 10 or less.

After the reaction to form the beta-hydroxy ester is completed, if desired, the tin salt may be inactivated in the ester product by reacting the ester product with 85%-95% phosphoric acid. In effecting inactivation of the salt, the acid is added to the ester reaction product at a concentration of 0.1% to 0.2% based on the weight of the ester and heated at 25° to 40°C for 0.5 to 2 hours whereupon an insoluble colloidal solid can be separated from the reaction product by filtration or other simple separation technique or may be allowed to remain in the reaction product.

The proportions of ethylenically unsaturated alpha, beta-carboxylic acid and polyepoxide employed in preparing the ethylenically unsaturated beta-hydroxy ester compositions of the present invention is not critical. In general, a molar equivalent of polyepoxide is utilized for 1 to 2 molar equivalents of the ethylenically unsaturated carboxylic acid.

The alpha, beta-ethylenically unsaturated carboxylic acids which may be reacted with the polyepoxide to prepare the beta-hydroxy esters in accordance with the process of the present invention include the monocarboxylic acids having three to six carbon atoms such as acrylic acid, methacrylic acid, ethacrylic acid and crotonic acid. Of these acrylic and methacrylic acids are preferred. In preparing the beta-hydroxy esters, a portion of these unsaturated acids may be replaced by saturated acids having three to 18 carbon atoms such as caprylic, pelargonic, palmitic, and the like to vary the physical properties of the beta-hydroxy ester. The saturated acid may be incorporated in the reaction medium at a concentration that does not exceed 25 mole percent of the total acid and is generally in the range of about 5 to about 20 mole percent.

The polyepoxides used to prepare the beta-hydroxy esters in the practice of the present invention comprise all those organic compounds containing at least two reactive epoxy groups, i.e.,

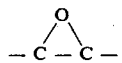

groups in their molecule. The polyepoxides may be saturated or unsaturated, aliphatic, cycloaliphatic, aromatic, or heterocylic and may be substituted if desired with non-interfering substituents.

Aromatic polyepoxides are the polymeric reaction products of polyhydric mono and polynuclear phenols with polyfunctional halohydrins and/or glycerol dichlorohydrin. A large number of polyepoxides of this type are disclosed in the Greenlee patents, U.S. Pat. Nos. 2,585,115 and 2,589,245. In addition many of these resins are commercial products. Typical polyhydroxy phenols useful in the preparation of aromatic polyepoxides include resorcinol and various diphenols resulting from the condensation of phenol with aldehydes and ketones such as formaldehyde, acetaldehyde, acetone, methyl ethyl ketone and the like. A typical aromatic polyepoxide is the reaction product of epichlorohydrin and 2,2-bis (p-hydroxy phenyl) propane (Bisphenol A), the resin having the following structural formula:

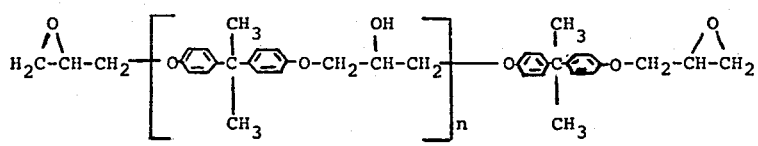

wherein $n$ is zero or an integer up to 10. Generally speaking, $n$ will be no greater than 2 or 3 and is preferably 1 or less.

In DER 332, an aromatic polyepoxide of the type above described and commercially available from the Dow Chemical Company, $n$ is zero.

Aliphatic polyepoxides are the reaction products of ephihalohydrins with aliphatic polyhydric alcohols such as trimethylol ethane, glycerol, pentaerythritol, sorbitol, trimethylol propane, erythritol, arabitol, mannitol, trimethylene glycol, tetramethylene glycol, ethylene glycol, polyethylene glycol, propylene glycol, polypropylene glycol, butylene glycol, polybutylene glycol and the like.

RD-2, the diglycidyl ether of 1,4 butylene glycol, manufactured by Ciba is an example of a commercially available aliphatic polyepoxide.

The stabilized ethylenically unsaturated beta-hydroxy ester compositions prepared by the process of the present invention are useful as radiation curable coating materials for coating a variety of substrates such as metal, paper, and wood. The stabilized ester may be used alone or in combination with other unsaturated compounds such as vinyl monomers and the like.

The stabilized beta-hydroxy esters are particularly useful as components of printing ink vehicles which are curable by ultraviolet radiation. In preparing such printing ink vehicles the stabilized ethylenically unsaturated beta-hydroxy ester is advantageously admixed with at least one other ethylenically unsaturated polyester such as polyacrylates and polyitaconates, and a photosensitizer.

Polyacrylates are prepared from a polyhydric alcohol having from two to six hydroxyl groups and an alpha, beta-ethylenically unsaturated monocarboxylic acid having from three to six carbon atoms, generally 50 to 100 percent of the hydroxy groups being esterfied with the ethylenically unsaturated monocarboxylic acid.

Illustrative polyhydric alcohols which may be used to prepare polyacrylates include ethylene glycol, polyethylene glycol, propylene glycol, polypropylene glycol, diethylene glycol, butanediol, trimethylolethane, trimethylolpropane, trimethylolhexane, glycerol, mannitol, pentaerythritol and mixtures of these polyhydric alcohols.

Unsaturated monocarboxylic acids which may be reacted with the polyhydric alcohols to prepare the polyacrylates include acrylic acid, methacrylic acid and ethylacrylic acid.

The polyitaconates are prepared by reacting 0.8 to 1 mole itaconic acid with 1 to 1.2 moles by an aliphatic or aromatic polyepoxide or a mixture thereof, preferably in the presence of a small amount of a saturated dibasic acid containing 20 to 40 carbon atoms, such as the $C_{36}$ dimer acids prepared by the polymerization of $C_{18}$ unsaturated fatty acids. The amount of saturated dicarboxylic incorporated in the polyitaconate reaction mixture is generally in the range of 5 to 15 mole percent based on the itaconic acid.

Photosensitizers found to be particularly useful in sensitizing the beta-hydroxy ester are derivatives of anthraquinones such as 1-chloro, 2-chloro, 2-methyl, 2-ethyl and 1-chloro-2-methyl, anthraquinone.

Rapid ultraviolet curable printing ink vehicles particularly suitable for application to metal substrates contain 30 to 65% by weight, and preferably 40 to 50% by weight of the beta-hydroxy ester, 2 to 10% by weight and preferably 2 to 6% by weight of the polyitaconate, 40 to 70% by weight and preferably 45 to 65% by weight of the polyacrylate or mixtures thereof and 0.10 to 5% weight and preferably 0.5 to 1.5 by weight of the photosensitizier.

In general, printing inks prepared using radiation curable vehicles are prepared in the same manner as conventional printing inks only using the vehicle components as disclosed herein. Generally the printing inks contain about 30 to about 80 percent by weight of the vehicle and about 20 to 70 percent by weight of a pigment such as $TiO_2$.

In printing metal surfaces with radiation curable printing inks, the ink is applied using a printing press conventionally used for printing on a metal substrate.

Once the metal substrate, generally in the form of a sheet, is printed, the substrate is positioned to pass under s source of ultraviolet light to cure and dry the ink. In most instances, the ultraviolet light source is maintained at about 0.5 to about 5 inches from the printed substrate undergoing irradiation.

Rapid drying of the ink is effected within a 0.5 to 2.0 second period using ultraviolet light emitted from an artificial source having a wavelength in the range between 4000A and 1800A. The output of commercially available ultraviolet lamps generally vary between 100 watt/in. to 200 watt/in. of lamp surface.

High pressure mercury vapor discharge lamps of quartz are the preferred source of ultraviolet light. Medium-pressure mercury vapor discharge lamps of quartz may be employed if desired.

As regards any particular conditions of source and distance, the duration of the irradiation treatment can be determined by a few trials.

The present invention is illustrated, but not limited, by the following Examples:

EXAMPLE I

To a reaction vessel, equipped with a condenser, stirrer, thermometer, and nitrogen inlet tube was charged the following reactants:

| | |
|---|---|
| Bisphenol A - Diglycidyl ether (DER 332) | 400 grams (1.15M) |
| Glacial acrylic acid | 132.8 grams (1.84M) |
| Pelargonic acid | 31.6 grams (0.2M) |
| Benzyl dimethyl amine | 4.0 grams |
| Stannous chloride (in 50 mls. methylethyl ketone) | 2.0 grams |

The temperature of the reaction mixture was raised to and maintained at 102°C for 4.0 hours under nitrogen atmosphere. Titration of a sample of the reaction mixture with a 0.2N alcoholic KOH solution at this time indicated that the reaction mixture had an acid value of 1.4 indicating substantially complete reaction of the bisphenol ether with the acrylic acid. The resultant reaction product was a pale slightly cloudy solution. The bisphenol ether/acrylic acid ester reaction mixture was then treated with 1 gram of 86.7% $H_3PO_4$ in 100 ml. methylethyl ketone and stirred for 1 hour at room temperature to inactivate the $SnCl_2$ and neutralize the catalyst.

A portion of the inactivated reaction mixture was placed in a brown bottle and examined periodically for evidence of gel formation. The gel stability is recorded in the Table below.

For purposes of comparison, in a separate series of reactions, the procedure of the Example was repeated with the exception that either $SnCl_2$ was not used, the benzyl dimethyl amine catalyst was not employed, or some metal chloride salt other than $SnCl_2$ was incorporated in the reaction mixture. These comparison compositions were also tested for gel stability. The results of these comparison tests designated by the symbol "C" are also summarized in the Table

TABLE

| TEST NO. | STABI-LIZER | OBSERVATIONS | GEL STABILITY (weeks) |
|---|---|---|---|
| 1 | $SnCl_2$ | — | over 28 |
| $C_1$ | none | Reaction product gelled during preparation. | — |
| $C_2$ | $SnCl_2$ | No catalyst* | 4 |
| $C_3$ | $CuCl_2$ | Reaction product gelled during preparation. | — |
| $C_4$ | $ZnCl_2$ | Reaction product gelled during preparation. | — |

*Acid number = 163 indicates large amount of acrylic acid unreacted.

A white ink was prepared on a three roll mill using 50% of a titanium dioxide pigment and 50% of an ink vehicle including the beta-hydroxy ester prepared above, the vehicle having the following composition:

| COMPONENT | WEIGHT PERCENT |
|---|---|
| Beta-hydroxy ester | 44.1 |
| Polyitaconate* | 4.4 |
| Polyethylene glycol**diacrylate | 11.0 |
| Pentaerythritol tetraacrylate | 39.6 |
| 1-chloro-2-methyl anthraquinone | 0.9 |

*Reaction product of 0.6 moles DER 332, 0.25 moles RD-2, 0.7 moles itaconic acid and .075 moles $C_{36}$ dimer acid.
**Molecular weight 200.

The ink had a tack of 31.

Using a conventional lithographic technique (ATF Chief 20 A printing press) the white ink was printed upon the surface of 5 × 3 inch steel plates of the type used in the manufacture of metal cans.

After application of the printing, the printed plates were placed on a continuously moving conveyor which passed under a bank of three 12 inch, high pressure mercury lamps mounted parallel to each other. The radiation emitted by the lamps was approximately 100 watts/in. of lamp surface. The conveyor was adjusted so that the coated plates traveled under the surface of the ultraviolet lamp bank so that the plates were 1.0 inch from the lamp surface. The speed of the conveyor belt was adjusted so that the printed plates were exposed to the ultraviolet radiation for about 2 seconds whereby total drying of the plate was effected.

EXAMPLE II

The procedure of Example I was repeated with the exception that the beta-hydroxy ester reaction product was not treated with phosphoric acid. No gel formation was noted after storage of the ester reaction product in a brown bottle for more than 3 months.

A white ink was prepared following the procedure of Example I using the beta-hydroxy ester prepared in Example II as a vehicle component. The vehicle had the following composition:

| COMPONENT | WEIGHT PERCENT |
|---|---|
| Beta-hydroxy ester | 49.0 |
| Polyitaconate | 6.0 |
| Polyethylene glycol diacrylate | 6.5 |
| Pentaerythritol tetraacrylate | 37.5 |
| 1-chloro, 2-methyl anthraquinone | 1.0 |

The ink had a tack of 32.

Following the printing procedure of Example I, the white ink containing the beta-hydroxy ester component of Example II was printed on steel plate. Total drying of the ink was effected in less than 1 second using the ultra-violet radiation.

What is claimed is:

1. In the method of preparing an ethylenically unsaturated beta-hydroxy ester susceptible of polymerization by ultraviolet radiation wherein a mixture of a polyepoxide having at least two epoxide groups in the polyepoxide molecule and an alpha, beta-ethylenically unsaturated carboxylic acid having three to six carbon atoms is reacted in the presence of an alkaline catalyst, wherein the improvement comprises incorporating in the mixture a small but effective amount of a tin halide salt to prepare the beta-hydroxy ester which is stable to premature gelation.

2. The method of claim 1 wherein the polyepoxide is the diglycidyl ether of Bisphenol A.

3. The method of claim 1 wherein the acid is acrylic acid.

4. The method of claim 1 wherein the tin halide salt is $SnCl_2$.

5. The method of claim 1 wherein the catalyst is a tertiary amine.

6. The method of claim 5 wherein the tertiary amine is N,N' benzyl dimethyl amine.

7. The method of claim 1 wherein the tin salt is present in the mixture at a concentration of 0.1% to 1.0% by weight.

* * * * *